B. E. CHUTE.
CUSHION TIRE FOR VEHICLES.
APPLICATION FILED NOV. 22, 1915.
1,309,460.
Patented July 8, 1919.
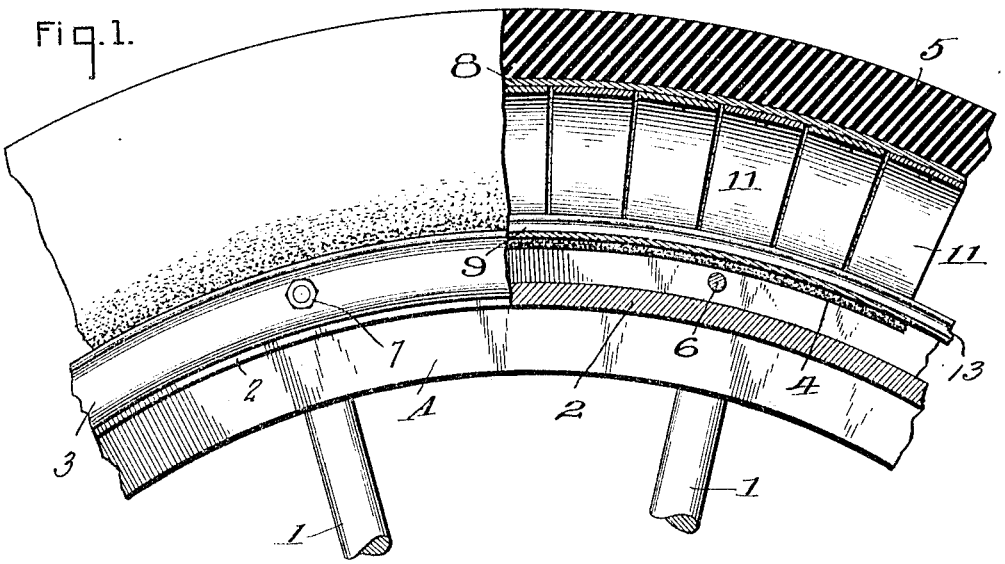
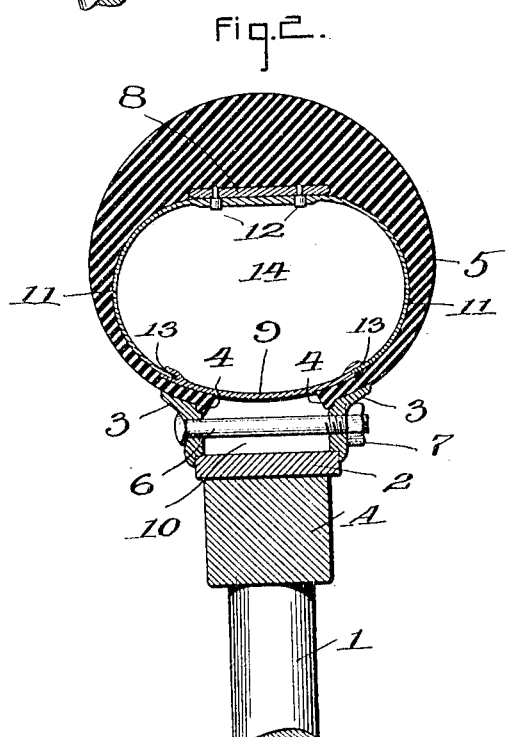

UNITED STATES PATENT OFFICE.

BURPIE E. CHUTE, OF TUCSON, ARIZONA.

CUSHION-TIRE FOR VEHICLES.

1,309,460.  Specification of Letters Patent.  Patented July 8, 1919.

Application filed November 22, 1915. Serial No. 62,897.

*To all whom it may concern:*

Be it known that I, BURPIE E. CHUTE, a citizen of the United States, residing at Tucson, in the county of Pima and State of Arizona, have invented certain new and useful Improvements in Cushion-Tires for Vehicles, of which the following is a specification.

My invention relates to an improvement in cushion-tires for vehicles, and it consists in two continuous steel springs, which extend circumferentially, and short curved springs secured to the outer continuous spring, and having their edges connected with the inner continuous spring, with a rubber fabric casing inclosing the springs and secured to the wheel rim.

In the accompanying drawings:—

Figure 1 is a side view partly in section of a portion of the wheel; and

Fig. 2 is a vertical transverse section.

A, is the felly; 1, 1, are the spokes; 2, is the usual rim; and 3, 3, are the tire retaining flanges embracing the edges of the rim 2 as well as the beads 4 of the rubber fabric casing or shoe 5, they being held together by the bolts 6 and nuts 7 screwed thereon.

Two continuous steel springs 8 and 9 extend parallel and circumferentially of the wheel. The spring 9 is slightly curved, preferably as shown in Fig. 2, and spring 8 may be perfectly flat. Spring 9 overlaps the beaded edges 4, 4 of the rubber fabric casing and bridges the space 10 therebetween, and between this continuous spring 9 and the tire retaining flanges 3, 3, the beaded edges of the rubber fabric casing are held and clamped.

Transverse bow-springs 11, 11, of steel are secured by rivets 12, 12, to the continuous spring 8, and their ends extend into the grooves 13, 13, at the opposite edges of the continuous spring 9, as shown in Fig. 2, thus forming the central air-space 14 and giving uniform resiliency and support to the tire throughout its length and distributing the strain, preventing collapse or weakness at any point.

This tire is easy and simple to make and is durable and effective in use.

I claim:

A cushion tire for vehicles comprising two continuous springs spaced apart, one slightly curved transversely and provided with grooved edges, and a plurality of transverse bow-springs secured to one of said springs, with their free ends in the grooves of the other, a rim, a fabric casing or shoe, tire retaining flanges adapted to embrace the opposite edges of the rim and the edges of the fabric casing or shoe to draw the edges of the casing or shoe inwardly and in close contact with the inner continuous spring, whereby all-embracing pressure is applied to the bow-springs and their inner ends are held in the grooves of the inner continuous spring.

In testimony whereof I affix my signature.

BURPIE E. CHUTE.

Witness:
WALTER E. LOVEJOY.

Copies of this patent may be obtained for five cents each, by addressing the "Commissioner of Patents, Washington, D. C."